US012729654B2

(12) United States Patent
Ginter et al.

(10) Patent No.: US 12,729,654 B2
(45) Date of Patent: Sep. 8, 2026

(54) SYSTEMS AND METHODS FOR CONTROLLING CYLINDER COMBUSTION IN A DUAL FUEL ENGINE USING IN-CYLINDER PRESSURE SENSING

(71) Applicant: Caterpillar Inc., Peoria, IL (US)

(72) Inventors: David M. Ginter, Peoria, IL (US); Kenth I. Svensson, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/767,346

(22) Filed: Jul. 9, 2024

(65) Prior Publication Data

US 2026/0015980 A1 Jan. 15, 2026

(51) Int. Cl.
*F02D 19/06* (2006.01)
*F02D 41/38* (2006.01)
*F02D 41/40* (2006.01)

(52) U.S. Cl.
CPC ......... *F02D 19/061* (2013.01); *F02D 41/403* (2013.01); *F02D 2041/389* (2013.01); *F02D 2200/024* (2013.01)

(58) Field of Classification Search
CPC ................. F02D 19/061; F02D 41/403; F02D 2041/389; F02D 2200/024
USPC .......................................................... 123/299
See application file for complete search history.

(56) References Cited

U.S. PATENT DOCUMENTS 5,097,803 A * 3/1992 Galvin ................ F02D 19/0655 123/3
6,032,617 A * 3/2000 Willi ....................... F02D 19/10 123/304
6,340,003 B1 * 1/2002 Schoubye ............. F02M 27/02 123/3
6,502,533 B1 * 1/2003 Meacham ............. F02M 27/02 429/513
6,659,068 B2 * 12/2003 Urushihara ........... F02D 35/023 123/430
6,722,345 B2 * 4/2004 Saeki .................... F02D 35/023 123/299
6,786,200 B2 * 9/2004 Viele ................... F02D 41/1498 123/406.12
6,854,438 B2 * 2/2005 Hilger ................. F02B 23/0657 123/145 A
6,910,449 B2 * 6/2005 Strom .................. F02D 41/402 123/299
(Continued)

*Primary Examiner* — Logan M Kraft
*Assistant Examiner* — John D Bailey

(57) ABSTRACT

A dual fuel, internal combustion engine system is described herein. The system uses in-cylinder pressure detectors to determine the combustion quality in a particular cylinder. The fuel controller commences a remediation process when a detected pressure indicates or is calculated indicating that an out-of-range pressure-based combustion characteristic is present. A remediation process may be to change the timing of the fuel injectors. The fuel controller can increase or decrease the time a fuel injector for a primary fuel or a pilot fuel is open, making adjustments until the out-of-range pressure-based combustion characteristic is cleared. In another example, the fuel controller can modify the amount of pilot fuel produced and/or the ratio of the pilot fuel to methanol/water in the reactor product can be modified to attempt to clear the out-of-range pressure-based combustion characteristic.

14 Claims, 5 Drawing Sheets

(56) References Cited

U.S. PATENT DOCUMENTS 7,337,762 B2 * 3/2008 Eng .................... F02D 13/0265 123/305
7,415,963 B2 * 8/2008 Chmela .................... F02B 1/12 123/568.21
7,536,981 B2 * 5/2009 Sadikay .................... C10L 3/00 123/3
7,640,912 B2 * 1/2010 Lewis .................. F02D 19/084 123/304
7,694,666 B2 * 4/2010 Lewis .................. F02D 35/027 123/299
7,831,370 B2 * 11/2010 Kuronita .............. F02D 41/403 701/115
7,832,195 B2 * 11/2010 Takahashi ............ F02D 31/003 60/284
7,853,396 B2 * 12/2010 Ito ...................... F02D 19/0649 123/577
7,856,950 B2 * 12/2010 Kuzuoka ............... F02M 25/00 123/304
7,870,845 B2 * 1/2011 Sasaki .................. F02D 41/403 123/299
7,886,719 B2 * 2/2011 Thomas ............... F02D 41/402 123/299
7,904,233 B2 * 3/2011 Kweon ................ F02D 41/247 123/299
8,151,762 B2 * 4/2012 Nishimoto ............ F02B 23/104 123/406.47
8,165,779 B2 * 4/2012 Ostberg .............. F02D 41/3035 123/305
8,175,789 B2 * 5/2012 Kojima ................ F02D 35/023 123/299
8,437,945 B2 * 5/2013 Haskara ............... F02D 35/023 701/111
8,442,744 B2 * 5/2013 Kurtz ................... F02D 41/402 123/703
8,516,991 B2 * 8/2013 Tanno .................. F02D 35/028 123/304
8,682,568 B2 * 3/2014 Shimo .................... F02P 5/153 123/305
8,721,749 B2 * 5/2014 Penman .............. F02D 19/0628 123/1 A
9,109,498 B2 * 8/2015 Bradley ................ F02D 19/081
9,169,773 B2 * 10/2015 Bromberg ............... F02B 65/00
9,347,413 B2 * 5/2016 Schüle .................. F02D 35/023
9,840,998 B2 * 12/2017 Johnson .................. F02P 5/045
10,012,155 B2 * 7/2018 Barta ...................... F02D 41/26
10,323,586 B1 * 6/2019 Atterberry ............ F02D 19/081
10,823,105 B2 * 11/2020 Sanborn .................. F02D 41/38
11,318,436 B2 * 5/2022 Kim ....................... F02M 27/02
11,441,495 B2 * 9/2022 Bruner ................ F02D 19/0647
11,639,698 B1 * 5/2023 Schroeder ........... F02D 19/0689 123/305
11,643,987 B2 * 5/2023 Montgomery ...... F02D 41/0027 123/299
11,788,495 B2 * 10/2023 Groth .................... F02D 41/144 123/540
12,078,115 B1 * 9/2024 Svensson ............ F02D 19/0647
12,215,639 B1 * 2/2025 Svensson .............. F02D 35/028
2006/0236974 A1 * 10/2006 Randall ............... F02D 19/0605 123/304
2008/0098985 A1 * 5/2008 Kamio ................ F02D 19/0655 123/304
2008/0257301 A1 * 10/2008 Hotta .................. F02D 19/0676 123/3
2008/0308496 A1 * 12/2008 Aagesen .............. B01D 61/362 95/251
2009/0070008 A1 * 3/2009 Batenburg ......... F02M 21/0224 123/299
2009/0151697 A1 * 6/2009 Hatano ................. F02D 35/023 123/299
2009/0166264 A1 * 7/2009 Duraiswamy .......... C10G 45/02 422/600
2009/0211350 A1 * 8/2009 Iwazaki .............. F02D 41/1456 73/114.75
2009/0277404 A1 * 11/2009 Hu .......................... F02B 41/06 701/102
2010/0224167 A1 * 9/2010 Leone ................... F02D 41/064 123/576
2010/0224168 A1 * 9/2010 Yasuhara ............. F02D 35/028 123/406.47
2010/0242899 A1 * 9/2010 Hitomi ................ F02D 41/3035 123/305
2010/0242900 A1 * 9/2010 Hitomi .................. F02D 41/402 123/299
2010/0304228 A1 * 12/2010 Majarov ........... H01M 8/04067 429/408
2011/0005491 A1 * 1/2011 Terada .................. F02D 35/026 123/299
2011/0023363 A1 * 2/2011 Mason ....................... C10J 3/66 48/197 R
2011/0265455 A1 * 11/2011 Hirota ................. F02D 19/0644 60/285
2012/0285417 A1 * 11/2012 Kim ........................ F02D 19/10 123/304
2012/0324870 A1 * 12/2012 Hoshi .................. F02D 19/061 60/285
2012/0325180 A1 * 12/2012 Montgomery ...... F02D 19/0694 123/299
2013/0000569 A1 * 1/2013 Schneider .................. C10J 3/62 123/3
2013/0037622 A1 * 2/2013 Kim .................. F02M 63/0285 239/413
2013/0108516 A1 * 5/2013 Fuse ......................... C01B 3/56 422/612
2013/0138328 A1 * 5/2013 Shimo .................. F02D 35/026 701/104
2013/0186448 A1 * 7/2013 Ranalli ..................... F01N 3/10 60/272
2014/0230793 A1 * 8/2014 Mashiki .................. F02D 41/40 123/478
2014/0330504 A1 * 11/2014 Nistler .................... F02D 41/40 701/104
2015/0075487 A1 * 3/2015 Glugla .................... F02D 41/30 123/299
2015/0167588 A1 * 6/2015 Beutel ....................... C10L 3/00 48/213
2015/0219027 A1 * 8/2015 zur Loye ............. F02D 35/027 60/323
2015/0285178 A1 * 10/2015 John ..................... F02D 41/005 123/27 R
2016/0003170 A1 * 1/2016 zur Loye ............ F02D 19/0647 123/577
2016/0115895 A1 * 4/2016 Ochi ..................... F02D 41/403 123/305
2016/0123286 A1 * 5/2016 Hou ..................... F02M 45/086 123/304
2016/0169147 A1 * 6/2016 Surnilla .............. F02D 41/2461 123/299
2016/0237900 A1 * 8/2016 Thiriet .................... F01D 25/10
2017/0198671 A1 * 7/2017 Dudar .................. F02M 35/104
2017/0211523 A1 * 7/2017 Rowley ................ F02M 27/045
2017/0348659 A1 * 12/2017 Northrop .................. C01B 3/26
2018/0087466 A1 * 3/2018 Bromberg ............... F02D 37/02
2018/0328304 A1 * 11/2018 Pursifull ............. F02D 41/3094
2018/0340487 A1 * 11/2018 Morris ................ F02D 41/0087
2019/0024572 A1 * 1/2019 Kurtz .................... F02D 41/402
2019/0024604 A1 * 1/2019 Kurtz ........................ F02B 7/04
2019/0145340 A1 * 5/2019 John ....................... F02D 41/40 123/299
2019/0234321 A1 * 8/2019 Hamad ............... F02D 41/0025
2019/0300364 A1 * 10/2019 Weiss ..................... B01J 23/464
2020/0088125 A1 * 3/2020 Shirahashi ............ F02D 41/403
2020/0271068 A1 * 8/2020 Dodis ..................... F02D 41/20
2021/0156321 A1 * 5/2021 Yao ....................... F01N 3/2066
2021/0404372 A1 * 12/2021 Klingbeil .............. F02D 41/401
2023/0033813 A1 * 2/2023 Kurtz ................... F02M 35/104
2023/0101071 A1 * 3/2023 Chiera .................. F02D 41/402 60/274

(56) References Cited

U.S. PATENT DOCUMENTS

| | | | | |
|---|---|---|---|---|
| 2023/0175431 | A1* | 6/2023 | Klingbeil | F02D 41/0055 60/273 |
| 2023/0184191 | A1* | 6/2023 | Yoshida | F02D 41/402 123/299 |
| 2023/0250773 | A1* | 8/2023 | Akiyama | F02D 41/068 123/445 |
| 2024/0271616 | A1* | 8/2024 | Tubb | F04B 39/126 |
| 2025/0116238 | A1* | 4/2025 | Kook | F02D 19/0689 |

* cited by examiner

SYSTEMS AND METHODS FOR CONTROLLING CYLINDER COMBUSTION IN A DUAL FUEL ENGINE USING IN-CYLINDER PRESSURE SENSING

TECHNICAL FIELD

The present disclosure relates generally to operating a prime mover, and more particularly, to actively managing combustion in one or more cylinders of a dual fuel, internal combustion engine using in-cylinder pressure sensing.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. As part of the effort to improve the efficiency and emissions of these engines, researchers have explored various types of alternate fuel mixtures, including alcohol fuels like methanol, ethanol, and other chemicals. In some examples, methanol is directly injected into an engine cylinder and the methanol is ignited with a pilot fuel or a spark. The use of methanol can provide various benefits over other alternative fuels. In some instances, a pilot fuel may be needed to assist in the ignition of the methanol. Some systems use dimethyl ether (DME) as a pilot fuel. This DME can be generated for use or stored in a tank. Various amounts of the DME and the methanol are added to the engine based on the power requirements of the engine, typically using a fuel MAP stored in a controller (such as an engine control unit) of the engine.

During the operation of the engine, the performance of the engine can change for various reasons. For example, components of the engine may break or become corroded, the fuel may have impurities, or the fuel delivery systems may experience variations in output, among other reasons. Some efforts have been made to control the power level in a dual fuel engine. For example, U.S. Patent Application Publication No. 2023/0101071 to Chiera and Hampson ("the '071 publication") describes a system for controlling the combustion of an ammonia fueled engine. The engine of the '071 publication includes a pressure sensor for each of the combustion chambers. The pressure sensor, along with a position sensor, is used to detect the position of the piston (body) within the combustion chamber. The position detected by the pressure sensor and the position sensor is used to control the introduction of fuel and the ignition of the fuel within the combustion chamber. However, the system of the '071 publication can be limited in its use. For example, the pressure sensor and the position sensor are used to detect a position of the piston in the combustion cylinder, but do not provide any information regarding the "quality" of combustion, i.e., whether or not the combustion chamber is producing an expected power output. Because the system of the '071 publication does not detect combustion (power output) issues within the combustion chambers, the system of the '071 publication does not provide a means to correct combustion issues.

Examples of the present disclosure are directed to overcoming deficiencies of such systems.

SUMMARY

In one aspect, a method of operating a dual fuel, internal combustion engine includes receiving a first pressure reading indication of a first combustion pressure of a first cylinder of the internal combustion engine, determining that the first pressure reading of the first cylinder comprises an out-of-range pressure-based combustion characteristic, commencing a fuel delivery remediation process by changing a first amount of time a pilot fuel injector for the first cylinder is open or a second amount of time a primary fuel injector for the first cylinder is open, determining that the first pressure reading indicates that the out-of-range pressure-based combustion characteristic has cleared, and ending the fuel delivery remediation process.

In another aspect, a fuel controller configured to actively manage combustion pressures of a dual fuel, internal combustion engine includes a memory storing computer-executable instructions, and a processor in communication with the memory, the computer-executable instructions causing the processor to perform acts comprising receiving a first pressure reading indication a first combustion pressure of a first cylinder of the internal combustion engine, determining that the first pressure reading of the first cylinder comprises an out-of-range pressure-based combustion characteristic, commencing a fuel delivery remediation process by changing a first amount of time a pilot fuel injector for the first cylinder is open or a second amount of time a primary fuel injector for the first cylinder is open, determining that the first pressure reading indicates that the out-of-range pressure-based combustion characteristic has cleared, and ending the fuel delivery remediation process.

In a still further aspect, a combustion engine system includes an internal combustion engine having a first cylinder and a second cylinder for combustion, the internal combustion engine configured to receive a primary fuel and a secondary fuel, wherein the secondary fuel is a pilot fuel for the primary fuel, a first direct-injection ("DI") fuel injector configured to receive the primary fuel and the pilot fuel for injection into the first cylinder for combustion, wherein combustion in the first cylinder generates a first combustion pressure, a second DI fuel injector configured to receive the primary fuel and the pilot fuel for injection into the second cylinder for combustion, wherein combustion in the second cylinder generates a second combustion pressure, and a fuel controller configured to actively manage the first combustion pressure and the second combustion pressure, the fuel controller comprising a memory storing computer-executable instructions, and a processor in communication with the memory, the computer-executable instructions causing the processor to perform acts comprising receiving a first pressure reading indication the first combustion pressure determining that the first pressure reading comprises an out-of-range pressure-based combustion characteristic, commencing a fuel delivery remediation process for the first cylinder by changing a first amount of time a pilot fuel injector of the first DI fuel injector is open or a second amount of time a primary fuel injector of the first DI fuel injector is open, determining that the first pressure reading indicates that the out-of-range pressure-based combustion characteristic has cleared, and ending the fuel delivery remediation process.

DETAILED DESCRIPTION

Figure 1:
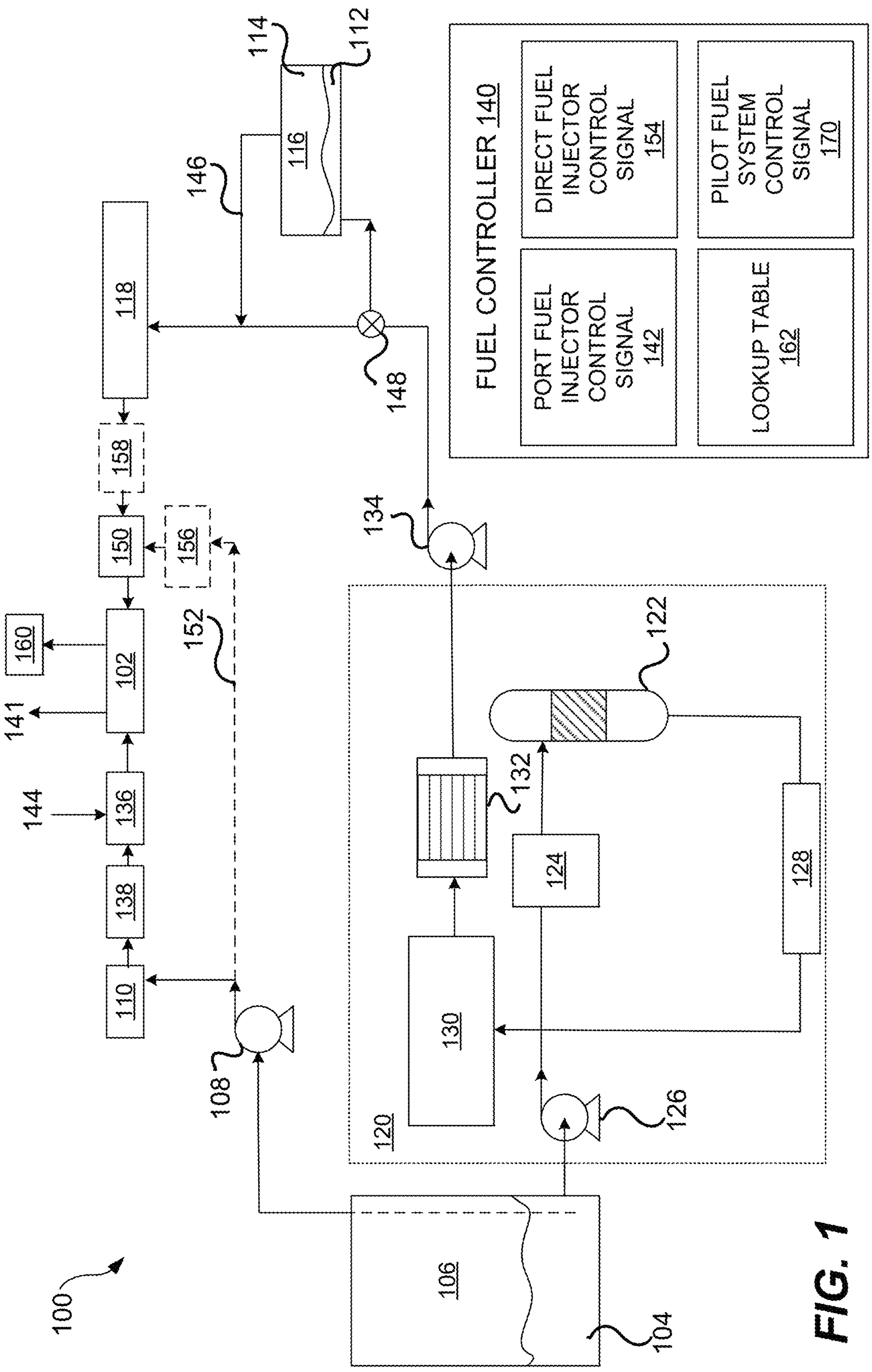
FIG. 1 is a schematic illustration of an internal combustion engine system using a fuel controller to remediate out of range pressure-based combustion characteristics within one or more combustion cylinders, in accordance with one or more examples of the present disclosure.

Wherever possible, the same reference numbers will be used throughout the drawings to refer to same or like parts. Referring to FIG. 1, there is shown a combustion engine system 100 that creates a pilot fuel using a primary fuel as a source for the pilot fuel, in accordance with one or more examples of the present disclosure. It should be noted that, in some examples, however, the pilot fuel used may be provided by another fuel source such as a supplier of the pilot fuel. The present disclosure is not limited to any particular source of the pilot fuel. The system 100 includes an engine 102. As used herein, the engine 102 is a type of prime mover that may be used separately from, or in conjunction with, other systems such as batteries, fuel cells, and the like. The engine 102 is an internal combustion engine fueled by a primary fuel 104 stored in a primary fuel tank 106. The primary fuel 104 may include an alcohol fuel such as methanol or ethanol, for example, or other fuel types (e.g., diesel fuel, gasoline, liquid natural gas, etc.). For the purposes of illustrating an example of the presently disclosed subject matter, the primary fuel 104 is methanol. The primary fuel 104 is pumped using a primary fuel pump 108 into a primary fuel rail 110 for use by the engine 102. As used herein, a "rail" is a fuel line that supplies fuel to injectors (not shown) of the engine 102. It should be noted that the presently disclosed subject matter is not limited to the use of fuel rails.

In some examples, the primary fuel 104 is a relatively lower cetane/higher octane type of fuel that, in the configuration illustrated in FIG. 1, uses a pilot fuel, such as a liquid pilot fuel 112, which is the liquid portion of a reactor product 128, or a gaseous pilot fuel 114, which is the vapor or gaseous portion of the reactor product 128, (collectively referred to herein as "the pilot fuel") stored in a storage tank 116 and provided through a pilot fuel rail 118, to cause the ignition of the primary fuel 104. The liquid pilot fuel 112 or the gaseous pilot fuel 114 may include a higher cetane/lower octane liquid fuel, and the primary fuel 104 may include a lower cetane/higher octane liquid fuel. The terms "higher" and "lower" in this context may be understood as relative terms in relation to one another. Thus, the liquid pilot fuel 112 or the gaseous pilot fuel 114 may have a higher cetane number and a lower octane number than a cetane number and an octane number of the primary fuel 104. The liquid pilot fuel 112 or the gaseous pilot fuel 114 may not be a single component, but rather, may include other components. For example, the liquid pilot fuel 112 may be produced from methanol and includes dimethyl ether (DME), water, and unreacted methanol. The gaseous pilot fuel 114 may be primarily DME but may contain other components.

In the system 100 of FIG. 1, the pilot fuel is produced by converting a portion of the primary fuel 104 into the pilot fuel using a pilot fuel system 120. Thus, while the primary fuel tank 106 stores the primary fuel 104 for use by the engine 102, the primary fuel tank 106 also stores fuel to produce the pilot fuel used by the engine 102. To produce the pilot fuel in the example of FIG. 1, the primary fuel 104 undergoes a dehydration reaction in reactor 122 according to the following chemical reaction (1):

$$2CH3OH \leftrightarrow CH3OCH3 + H2O; \quad (1)$$

where 2CH3OH is methanol, CH3OCH3 is dimethyl ether (DME), and H2O is water. The reactor 122, which is a methanol dehydration reactor in the example illustrated in FIG. 1, can be one of various types of reactors, having various types of catalysts, capable of dehydrating the methanol to DME. Some catalysts include, but are not limited to, aluminum oxide, zeolite, titanium oxide, and barium oxide. The reaction temperature within the reactor 122 can vary depending on flowrate and the catalyst used, with temperatures typically ranging from 200° C. to 400° C. Because the dehydration reaction provided above is an exothermic equilibrium equation, it follows that from a thermodynamic point of view high degrees of conversion are achieved at reaction temperatures as low as possible. However, a minimal temperature is typically needed from a reaction-kinetic point of view in order to ensure sufficient reaction rates and thus acceptable DME conversion rates.

To increase the temperature of the incoming primary fuel 104, heater 124 may be used for heating the incoming primary fuel 104 to a desired temperature. In some examples, the heater 124 may be used for preheating of the incoming primary fuel 104. The heater 124 may be one of various types of heaters including heat exchangers that use the heat of various fluids in the system 100 to preheat the primary fuel 104. In other examples, the heater 124 may be an electric or fuel burning heater. The present disclosure is not limited to any particular type of the heater 124 or the use of the heater 124. The heater 124 may be used to raise a temperature of the primary fuel 104 to approximately 310° C., although other temperatures may be used depending on the fuel type of the incoming primary fuel 104. It should be noted that more than one heater 124 may be used and is considered to be within the scope of the presently disclosed subject matter.

A pilot fuel pump 126 pumps a portion of the primary fuel 104 from the primary fuel tank 106 into the pilot fuel system 120. The pilot fuel pump 126 pumps the primary fuel 104 into the heater 124. The primary fuel 104 leaving the heater 124 is reacted in the reactor 122 to form the pilot fuel, in this example DME. The output of the reactor 122, reactor product 128, includes the liquid pilot fuel 112 and the gaseous pilot fuel 114, which can include the DME, water, and unreacted primary fuel 104. The output of the reactor 122, the reactor product 128, flows into a pressure regulator 130. The pressure regulator 130 can be used to maintain a pressure that helps to liquify at least a portion of the methanol and water in the reactor product 128. Liquifying the methanol and water help to separate the methanol and water from the DME to increase the purity of the liquid pilot fuel 112 and/or the gaseous pilot fuel 114. The reactor product 128 thereafter enters a condenser 132 to reduce the temperature (and in some examples, pressure) of the reactor product 128.

The condenser 132 can be one or more types of heat exchangers designed to reduce the temperature of the reactor product 128 including, but not limited to, a shell and tube heat exchanger, tube in tube heat exchanger, direct or indirect heat exchanger, or phase change heat exchanger. It should be noted that in some examples, the methanol and water are liquified primarily in, or exclusively in, the condenser 132. Thus, in these examples, the pressure regulator 130 may not be used or installed. The liquid pilot fuel 112 and/or the gaseous pilot fuel 114 are pumped to the storage tank 116 using product pump 134. The storage tank 116 can act as a buffer or "make-up" tank that allows for a consistent flow of the pilot fuel stored in the storage tank 116 into a pilot fuel rail 118. For example, the engine 102 may have a sudden increase in power demand whereby additional primary fuel 104 and pilot fuel are needed to supply the increased demand from the engine 102. In a similar manner, the engine 102 may have a sudden decrease in power demand, whereby less primary fuel 104 and pilot fuel are needed to supply the lower demand from the engine 102. In some examples, however, the pilot fuel system 120 may not be capable of an instantaneous or rapid increase or decrease of production of the pilot fuel. Thus, in order to maintain a desired combustion mixture ratio of the primary fuel 104 and the pilot fuel at the higher or lower power level, additional pilot fuel may be received from the storage tank 116. During this power demand cycle (e.g., an increase or decrease in power), the pilot fuel system 120 increases or decreases production.

Along with acting as a buffer, the pilot fuel in the storage tank 116 may also be used during a startup phase of the engine 102. While starting up the engine 102, the pilot fuel system 120 may be at a reduced temperature, whereby the efficiency of the reaction within the reactor 122 is insufficient to produce the reactor product 128. Thus, as in the situation in which an instant or rapid increase in power required by the engine 102 is met using the pilot fuel in the storage tank 116, the pilot fuel stored in the storage tank 116 prior to shutdown of the engine 102 can be used while the temperature of the reactor 122 of the pilot fuel system 120 increases to a desired operational temperature. Further, the pilot fuel in the storage tank 116 may be used during a shutdown of the engine 102. In some examples, the primary fuel 104 may need to be fully evacuated from the engine 102 prior to shut down. In some examples, during shutdown, the pilot fuel may be used in lieu of the primary fuel 104 so that, at full shutdown, there is no remaining primary fuel 104 in the engine 102. The evacuation process may be assisted using high pressure nitrogen or inert gas (not shown).

The engine receives the primary fuel 104 through the primary fuel rail 110 and into an air intake manifold 136 through a port fuel injector 138. A fuel controller 140 actively manages the pressure-based combustion characteristics in cylinders of the engine 102 by controlling various aspects of the engine 102. Pressure-based combustion characteristics may include a variety of characteristics that are determined or calculated from a measured pressure from cylinder of the engine. For example, the fuel controller 140 controls the opening and closing of the port fuel injector 138 using a fuel MAP. The fuel MAP has the instructions for the timing of the opening and closing of the port fuel injector 138 based on the power demands of the engine 102. The fuel MAP may be stored in the fuel controller 140 or may be stored in an engine control unit (ECU), not shown, of the engine 102. In some examples, the fuel controller 140 is a component, module, or function of the ECU or is a component, module, or function that is controlled by or receives input from the ECU. As more power is needed, the fuel controller 140 issues a port fuel injector control signal 142 to cause the port fuel injector 138 to have longer injection durations, to allow more of the primary fuel 104 to enter the air intake manifold 136 to mix with incoming air 144. Similarly, as less power is needed, the fuel controller 140 issues the port fuel injector control signal 142 to cause the port fuel injector 138 to have shorter injection durations, to allow less of the primary fuel 104 to enter the air intake manifold 136. The products of combustion within the engine 102 exit through an exhaust 141.

The engine receives the pilot fuel 112/114 either from the storage tank 116 or from the product pump 134. As used herein, the pilot fuel 112/114 may refer to the liquid pilot fuel 112 or the gaseous pilot fuel 114 depending on the location of the pilot fuel intake 146 within the storage tank 116. If the pilot fuel intake 146 is below the liquid level within the storage tank 116, the pilot fuel 112/114 received into the pilot fuel rail 118 will be the liquid pilot fuel 112. If the pilot fuel intake 146 is above the liquid level within the storage tank 116, the pilot fuel 112/114 received into the pilot fuel rail 118 will be the gaseous pilot fuel 114. The pilot fuel 112/114 can also be received directly into the pilot fuel rail 118 from the product pump 134. A pilot fuel diverter valve 148 can be used to maintain a level of the liquid pilot fuel 112 in the storage tank 116.

In some examples, the pilot fuel 112/114 is introduced into the engine 102 using a direct-injection (DI) fuel injector 150. A DI fuel injector 150 is an injector that receives fuel and injects the fuel directly into a combustion cylinder of the engine 102 rather than through another mean, such as the port fuel injector 138. In some examples, the DI fuel injector 150 can receive only the pilot fuel 112/114 or may receive two fuels such as both the pilot fuel 112/114 and the primary fuel 104. In this embodiment, illustrated as an alternate embodiment using dashed lines, the primary fuel 104 may be received into the DI fuel injector 150 through primary feed line 152, while the pilot fuel 112/114 is received into the DI fuel injector 150 through the pilot fuel rail 118.

As with the primary fuel 104, the fuel controller 140 controls the opening and closing of the DI fuel injector 150 using a fuel MAP. In the example in which the DI fuel injector 150 receives just the pilot fuel 112/114, as more power is needed, the fuel controller 140 issues a DI fuel injector control signal 154 to cause the DI fuel injector 150 to have longer injection durations to allow more of the pilot fuel 112/114 to enter the engine 102. Similarly, as less power is needed, the fuel controller 140 issues the DI fuel injector control signal 154 to cause the DI fuel injector 150 to have shorter injection durations to allow less of the pilot fuel 112/114 to enter the air intake manifold 136 of the engine 102. In the example in which DI fuel injector 150 receives both the primary fuel 104 and the pilot fuel 112/114, the DI fuel injector 150 may have a primary injector control 156, which is a valve that opens and closes to either allow or stop the flow of the primary fuel 104 into the DI fuel injector 150, and, a pilot fuel control 158, which is a valve that opens and closes to either allow or stop the flow of the pilot fuel 112/114 into the DI fuel injector 150. In this example, the DI fuel injector control signal 154 may be used to control the primary injector control 156 and/or the pilot fuel control 158.

As noted above, the engine 102 may experience a divergence in the power delivered by one or more cylinders of the engine 102 using the fuel MAP. The divergence in power may also be accompanied, or caused by, changes in pressure-based combustion characteristics within one or more of the cylinders of the engine 102. The pressure-based combustion characteristics can include, but are not limited to, indicated mean effective pressure (iMEP) gross, integrated net heat release rate, ignition delay, apparent heat release rate (AHRR), combustion pressure, and the like. Several of these and other pressure-based combustion characteristics can be calculated using known values and the measured pressure within the cylinder, and will be referred to here as pressure-based combustion characteristics. For example, Equation 1, below, may be used to calculate AHRR:

$$AHRR = \frac{\gamma}{\gamma - 1} \times P \times \frac{dV}{d\theta} + \frac{1}{\gamma - 1} \times V \times \frac{dP}{d\theta} \tag{1}$$

where $\gamma$ is a ratio of specific heats, V is the volume of the cylinder, $\theta$ is the crank angle and P is the pressure in the cylinder. Integrating AHRR with respect to theta, integrated apparent heat release rate (iAHRR) is determined. From IAHRR you can calculate other variables such as crank angle 10 (CA10), crank angle 50 (CA50) and the like as burn duration. Thus, if variables in Equation 1 other than P are known, measuring the pressure of the cylinder allows for the determination of the AHRR for a particular cylinder. Likewise, Equation 2, below, may be used to calculate iMEP:

$$iMEP_g = \frac{\int_{180}^{540} P dV}{V_d} \tag{2}$$

where iMEPg is the gross indicated mean effective pressure, P is the pressure in the cylinder, dV is the change in volume in the cylinder, and Vd is the displacement volume. As with Equation 1, above, measuring the cylinder pressure provides for the ability to calculate the iMEPg.

During the operation of the engine 102, the fuel controller 140 may use an in-cylinder pressure sensing unit 160 to detect the cylinder pressure in one or more of the cylinders of the engine 102. The fuel controller 140 may use the detected pressure to calculate these and other pressure-based combustion characteristics in one or more of the cylinders of the engine 102. In other examples, a desired operational range of a pressure-based combustion characteristic, or in-range characteristic, may be precalculated and stored as values in a lookup table 162. When the fuel controller 140 receives and calculates a pressure-based combustion characteristic that is outside of the range of characteristics in the lookup table 162, the fuel controller 140 may determine that an out-of-range pressure-based combustion characteristic exists. For example, the range of pressures may have a low-pressure threshold determined by one combustion characteristic and a high-pressure threshold determined by the same or another combustion characteristic. Thus, by maintaining the cylinder pressure within the one or more ranges in the lookup table 162, the fuel controller 140 may maintain the combustion characteristics within a range. A detection of a pressure outside of a range in the lookup table 162 may be an indication to the fuel controller 140 that the cylinder is experiencing one or more out-of-range pressure-based combustion characteristics. The in-cylinder pressure sensing unit 160 can be installed in one or more of the cylinders to be monitored, described in more detail in FIG. 2.

Figure 2:
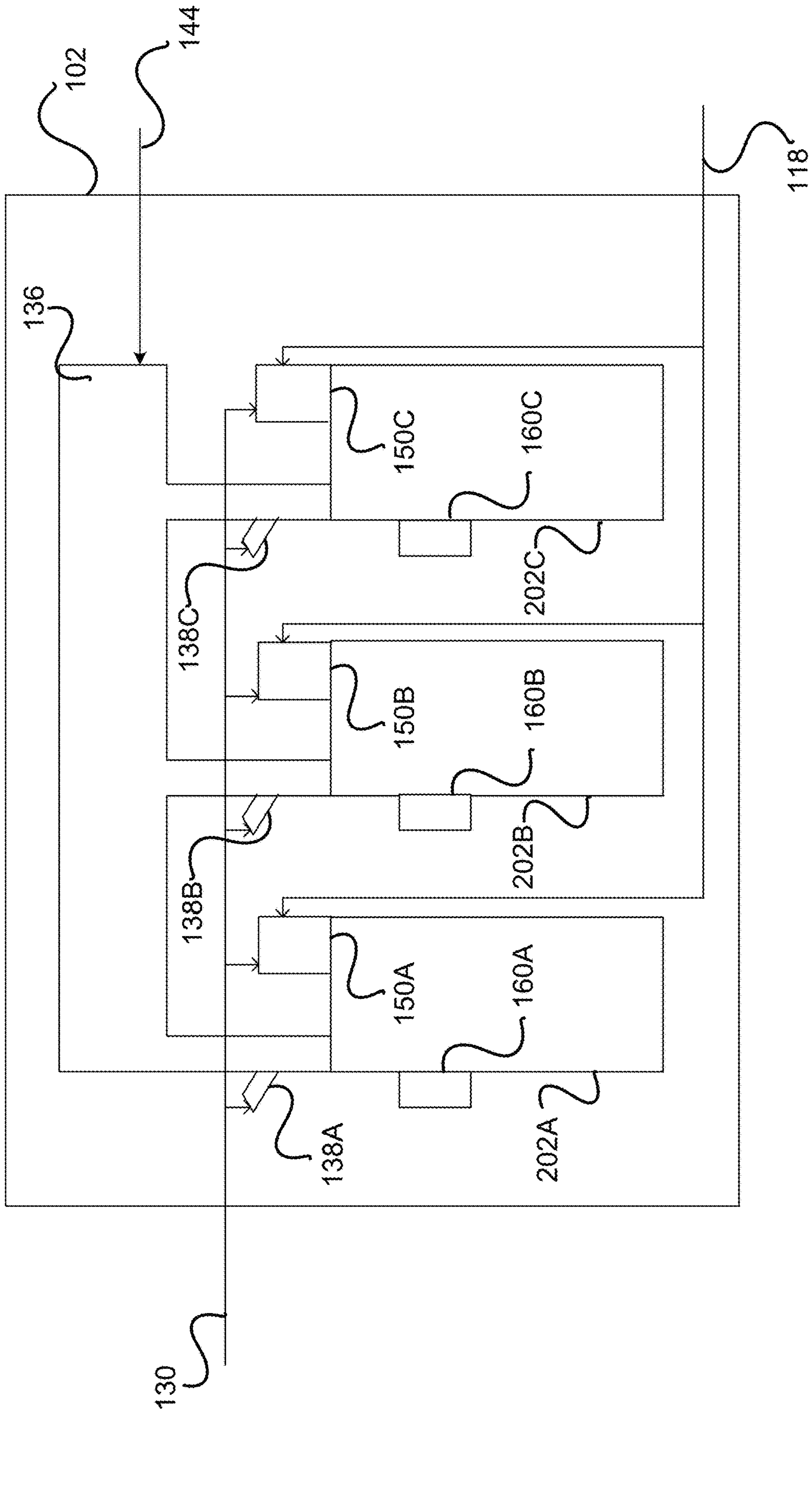
FIG. 2 illustrates an example of engine in-cylinder pressure sensing devices of a pressure sensing unit, according to various examples of the presently disclosed subject matter.

FIG. 2 illustrates an implementation of in-cylinder pressure sensing units to detect out-of-range pressure-based combustion characteristics, according to various examples of the presently disclosed subject matter. In FIG. 2, the engine 102 is shown with combustion cylinders 202A-202C. It should be noted that the engine 102 is not illustrated with all components that may be used, including valves, camshafts, pistons, and the like, as the illustration in FIG. 2 is merely to describe the use of the in-cylinder pressure sensing unit 160. The engine 102 receives the primary fuel 104 through the primary fuel rail 110 and the pilot fuel 112/114 through the pilot fuel rail 118. The incoming air 144 is directed into the air intake manifold 136 for use in the combustion cylinders 202A-202C. The primary fuel 104 received through the primary fuel rail 110 is introduced into the incoming air 144 using port fuel injectors 138A-138C. It should be noted that although each cylinder 202A-202C is illustrated as having a separate port fuel injector 138A-183C, in some examples, a single port fuel injector 138 may be used for all the cylinders 202A-202C. Also illustrated in FIG. 2 are DI fuel injectors 150A-150C. The DI fuel injectors 150A-150C receive the primary fuel 104 from the primary fuel rail 110 through a primary fuel port in the DI fuel injector 150 and the pilot fuel 112/114 from the pilot fuel rail 118 through a pilot fuel port in the DI fuel injector 150. It should be noted that the use of the DI fuel injectors 150A-150C and the port fuel injectors 138A-138C is merely an example. In some examples, the DI fuel injectors 150A-150C may be used without the port fuel injectors 138A-138C. In the example illustrated in FIG. 2, the DI fuel injectors 150A-150C receive the DME produced by the pilot fuel system 120 as a pilot fuel.

The pressure within each of the cylinders 202A-202C is detected using pressure sensing units 160A-160C. It is noted that the present disclosure does not require the use of the pressure sensing units 160A-160C in all of the combustion cylinders 202A-202C. In some examples, the pressure sensing units 160A-160C may be installed on fewer than all of the combustion cylinders 202A-202C. The pressure sensing units 160A-160C may be various types of pressure sensing units that detect the internal pressure of the combustion cylinders 202A-202C and provide the detected pressure (either wirelessly or through a wired connection) to the fuel controller 140. Some examples, include pressure sensing units that use a piezoelectric ring or crystal that is elastically compressed by the force developed by the combustion pressure generated by combustion within the combustion cylinders 202A-202C. Other types of pressure sensing units may be used and are considered to be within the scope of the presently disclosed subject matter. Further, technologies other than pressure sensing units for measuring the combustion pressure within each of the cylinders may be used and are considered to be within the scope of the present disclosure. For example, pressure sensing units on rod bearings and other components of the engine 102 that experience the compressive force within the combustion cylinders 202A-202C may also be used. The pressures detected by the pressure sensing units 160A-160C within the combustion cylinders 202A-202C is transmitted to the pressure sensing unit 160.

Returning back to FIG. 1, the in-cylinder pressure sensing unit 160 receives the pressure signals from the pressure sensing units (shown as the pressure sensing units 160A-160C in FIG. 2) and transmits the pressure signals, indicating the combustion pressures in the cylinders in which a pressure sensing unit is installed, to the fuel controller 140. The fuel controller 140 receives the pressure signals, calculates pressure-based combustion characteristics, and compares the characteristics per cylinder to values stored in a pressure-based combustion characteristic lookup table 162 by accessing the lookup table 162. The lookup table 162 is a listing of the desired or expected cylinder pressure-based combustion characteristics for each cylinder. The fuel controller 140, as a result of the comparison, may determine that the pressure-based combustion characteristic calculated for the particular cylinder is out of range, such as a low-pressure condition, whereby the combustion pressure is below an expected value or a high-pressure condition whereby the combustion pressure is above an expected value. A determination of when the characteristic calculated for the particular cylinder is out of range may be based on various factors. For example, an out-of-range determination may be based on a detected pressure received that is a predetermined pressure amount that is above or below the expected pressure in the lookup table 162. In another example, an out-of-range determination may be based on receiving a predetermined number of detected pressures within a predetermined time above or below the expected pressure in the lookup table 162. For example, an out-of-range determination may not be found if one detected pressure is below an expected pressure but only occurs once within a predetermined time frame. However, in the same example, an out-of-range determination may be found if two detected pressures are below an expected pressure found in the lookup table 162 within the same predetermined time frame. In other examples, an out-of-range determination may be found by the fuel controller 140 if the detected pressure fluctuates between a predetermined range of pressures within a predetermined time frame. For example, if the engine 102 is at a 60% power demand as sensed by a position of an engine 102 component such as a throttle or a power demand signal, if the detected pressure fluctuates in a range of 10 psig within 3 seconds, the fuel controller 140 may determine an out-of-range pressure-based combustion characteristic.

Figure 3:
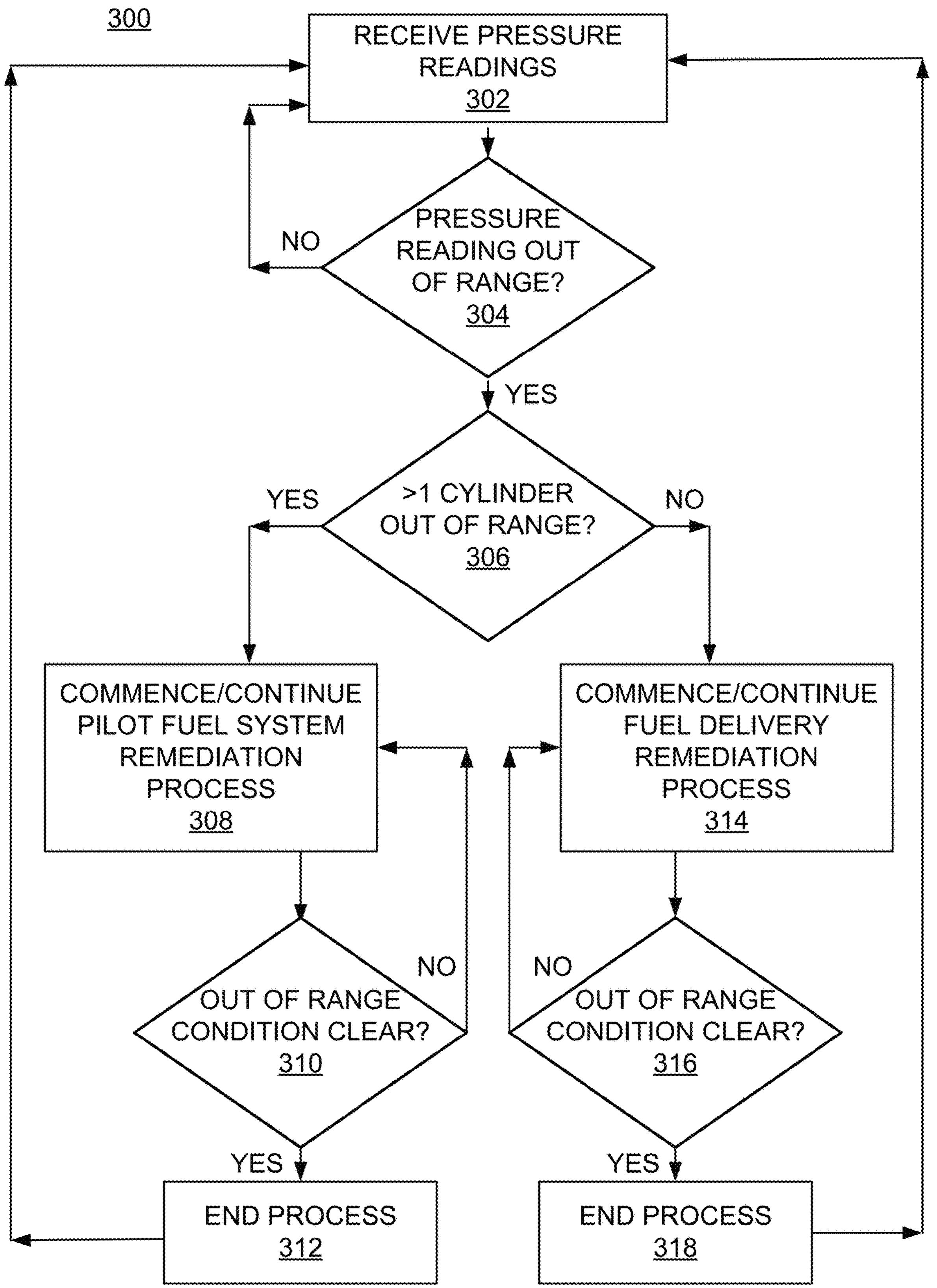
FIG. 3 illustrates a method 300 for the remediation of out-of-range pressure characteristics in a combustion cylinder of an internal combustion engine, in accordance with various examples of the presently disclosed subject matter.

When the fuel controller 140 determines an out-of-range pressure-based combustion characteristic, the fuel controller 140 commences a remediation process, described in more detail in FIG. 3. The remediation process performed by the fuel controller 140 is used by the fuel controller 140 to attempt to get the detected pressure in the one or more cylinders back to within a range of the expected pressures in the lookup table 162 indicating that one or more pressure-based combustion characteristics are in-range. In some examples, the remediation process generally changes an amount of the primary fuel 104 and/or the pilot fuel 112/114 entering the combustion chamber. For example, upon an out-of-range determination condition for a cylinder that indicates a detected pressure-based combustion characteristic below a predetermined amount from an expected value from the lookup table 162, in the case of the DI fuel injector 150 only receiving the pilot fuel 112/114, the fuel controller 140 may issue the DI fuel injector control signal 154 to cause the DI fuel injector 150 to stay open longer (increase injection duration). If the DI fuel injector 150 receives both the pilot fuel 112/114 and the primary fuel 104, the fuel controller 140 may issue the DI fuel injector control signal 154 to cause the pilot fuel control 158 to stay open longer (increase injection duration). The fuel controller 140 continues to monitor the detected pressure in the cylinder.

If increasing the amount of the pilot fuel 112/114 into the cylinder up to a predetermined volume/mass of the pilot fuel 112/114 does not clear the out-of-range determination, the fuel controller 140 may also change the amount of the primary fuel 104 entering the cylinder. The fuel controller 140 may change the amount of the primary fuel 104 concurrently with the changing of the amount of the pilot fuel 112/114 or may change the amount of the primary fuel 104 after a predetermined volume of increase of the pilot fuel 112/114. For example, if the fuel controller 140 determines that the detected pressure is a predetermined amount or percentage, such as 3%-5%, below the expected pressure, this may indicate an out-of-range pressure-based combustion characteristic condition. Thus, in this example, the fuel controller 140 may increase the amount of the pilot fuel 112/114 to 1 mg/s while also increasing the amount of the primary fuel 104 to 4 mg/s (the flow rates are merely an example, as the actual flow rates may vary depending on the particular configuration of the engine 102). In another example, if the fuel controller 140 determines that the detected pressure is 2 psig, for example, below the expected pressure indicating an out-of-range condition, the fuel controller 140 may increase the amount of the pilot fuel 112/114 to 1 mg/s and wait a predetermined period of time to determine if the increase in the amount of the pilot fuel 112/114 clears the out-of-range condition. If after a period of time the increase in the pilot fuel 112/114 does not clear the out-of-range pressure-based combustion characteristic, the fuel controller 140 may increase the amount of the primary fuel 104 to 4 mg/s. The fuel controller 140 may continue the remediation process of increasing the pilot fuel 112/114 and/or the primary fuel 104 until the out-of-range pressure-based combustion characteristic is cleared or the amount of change in the volume of the pilot fuel 112/114 and/or the primary fuel 104 is above or below a permitted volume change. In some examples, the fuel controller 140 may also receive inputs regarding combustion products, such as nitrogen oxides, and adjust the amount of the primary fuel 104 to maintain an acceptable level of combustion products. The fuel controller 140 continues to monitor the detected pressure and adjusts the change in the volume of the pilot fuel 112/114 and/or the primary fuel 104 to maintain the detected pressure within a range of the expected pressure.

In some examples, either in addition to, or in lieu of, changing the volume of the pilot fuel 112/114 and/or the primary fuel 104 entering the engine 102 to adjust the combustion characteristics within one or more of the cylinders of the engine 102, the fuel controller 140 may adjust the production of the pilot fuel 112/114 if the engine system 100 includes the pilot fuel system 120. The pilot fuel system 120 may need to be adjusted for various reasons. For example, the catalyst used in the reactor 122 may be aging, becoming less effective. Thus, the production of the pilot fuel 112/114, either in quantity or quality, may have changed over time. In some examples, the fuel controller 140 may adjust the conditions of the pilot fuel system 120 if out-of-range conditions are being detected for more than one cylinder, since issues with the production of the pilot fuel 112/114 by the pilot fuel system 120 can affect more than one cylinder.

In one example of the modification of the operational conditions of the pilot fuel system 120, the fuel controller 140 can issue a pilot fuel system control signal 170 to increase or decrease the production of the pilot fuel 112/114. For example, the fuel controller 140 can issue the pilot fuel system control signal 170 to change the outlet temperature of the heater 124 to change the reaction rate within the reactor 122, thereby changing the production rate of the pilot fuel 112/114. In another example, the fuel controller 140 can issue the pilot fuel system control signal 170 to change the pump speed of the pilot fuel pump 126, thereby changing the amount of the primary fuel 104 entering the reactor 122 and changing the production rate of the pilot fuel 112/114. In another example, the fuel controller 140 can issue the pilot fuel system control signal 170 to change the operating temperature of the condenser 132, whereby a reduced temperature causes more methanol/water to condense out of the reactor product 128. As with the remediation process described above whereby the fuel controller 140 changes the amount of the pilot fuel 112/114 and/or the primary fuel 104 entering a particular cylinder, the process of changing the operational conditions of the pilot fuel system 120 can be done periodically and repeated based on updated in-cylinder pressure readings. An example remediation process is illustrated in FIG. 3, below.

FIG. 3 illustrates a method 300 for the remediation of out-of-range pressure-based combustion characteristics in a combustion cylinder of an internal combustion engine, in accordance with various examples of the presently disclosed subject matter. The method 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The method 300 can be implemented or controlled by a controller, such as the fuel controller 140 of FIG. 1. The fuel controller 140 may be comprised of hardware, software, or various combinations thereof, described by way of example in FIG. 4.

The method 300 commences at step 302, where the fuel controller 140 is receiving in-cylinder pressure readings from the pressure sensing unit 160. The pressure sensing unit 160 receives signals from one or more of the pressure sensing units 160A-160C installed on the combustion cylinders 202A-202C of the engine 102.

At step 304, the fuel controller 140 uses the pressure readings to determine if one or more of the detected pressure-based combustion characteristics are out of range. A determination of when the pressure detected for a particular cylinder is out of range may be based on various factors. For example, an out-of-range determination may be based on a detected pressure received that is a predetermined pressure amount that is above or below the expected pressure in the lookup table 162. In another example, an out-of-range determination may be based on receiving a predetermined number of detected pressures within a predetermined time above or below the expected pressure in the lookup table 162. For example, an out-of-range determination may not be found if one detected pressure is below an expected pressure but only occurs once within a predetermined time frame. However, in the same example, an out-of-range determination may be found if two detected pressures are below an expected pressure found in the lookup table 162 within the same predetermined time frame. In other examples, an out-of-range determination may be found by the fuel controller 140 if the detected pressure fluctuates between a range of pressures within a predetermined time frame. For example, if the engine 102 is at a 60% power demand as sensed by a position of an engine 102 component such as a throttle, if the detected pressure fluctuates in a range of 10 psig within 3 seconds, the fuel controller 140 may determine an out-of-range pressure-based combustion characteristic. The present disclosure is not limited to a basis for an out-of-range pressure-based combustion characteristic.

If at step 304 the fuel controller 140 determines that a received pressure is not out of range, method 300 continues at step 302. It is noted that step 302 may continue throughout the method 300, as the fuel controller 140 may implement one or more steps of the method 300 at different times or concurrently for different combustion cylinders. If at step 304 the fuel controller 140 determines that the received pressure is out of range, the method 300 continues at step 306, where the fuel controller 140 determines if more than one of the combustion cylinders have detected pressures out of range. As mentioned above, if more than one combustion cylinder is experiencing an out-of-range pressure-based combustion characteristic, the fuel controller 140 may look to a common cause of the out-of-range pressure-based combustion characteristic, which may be the pilot fuel system 120. It is noted that step 306 may be optional, as the fuel controller 140 may continue from step 304 and move directly to step 314 and/or step 308 rather than moving to step 306.

If at step 306 the fuel controller 140 determines that more than one of the combustion cylinders have detected pressures out of range, the method 300 continues to step 308, where the fuel controller 140 commences a remediation process on the pilot fuel system 120. The fuel controller 140 can issue the pilot fuel system control signal 170 to modify the operation of the pilot fuel system to increase or decrease the production of the pilot fuel 112/114. For example, the fuel controller 140 can issue the pilot fuel system control signal 170 to change the outlet temperature of the heater 124 to change the reaction rate within the reactor 122, thereby changing the production rate of the pilot fuel 112/114. In another example, the fuel controller 140 can issue the pilot fuel system control signal 170 to change the pump speed of the pilot fuel pump 126, thereby changing the amount of the primary fuel 104 entering the reactor 122 and changing the production rate of the pilot fuel 112/114. The fuel controller 140 can issue the pilot fuel system control signal 170 to change the operating temperature of the condenser 132, whereby a reduced temperature causes more methanol/water to condense out of the reactor product 128, thus changing the amount of the pilot fuel 112/114 provided to the storage tank 116.

At step 310, the fuel controller 140 determines if the out-of-range pressure-based combustion characteristic for the one or more cylinders has cleared. If the out-of-range pressure-based combustion characteristic has not cleared, the method 300 continues with the pilot fuel system 120 remediation process of step 308. If the out-of-range pressure-based combustion characteristic has cleared, at step 312 the fuel controller 140 ends the pilot fuel system 120 remediation process and continues back to step 302.

If at step 306 the fuel controller 140 determines that the fuel cell remediation process of step 308 is not to be performed, the method 300 continues to step 314, whereby the fuel controller 140 commences the fuel delivery remediation process of step 314. The fuel delivery remediation process generally changes an amount of the primary fuel 104 and/or the pilot fuel 112/114 entering the combustion chamber. For example, upon an out-of-range determination condition for a cylinder that indicates a detected pressure below a predetermined amount from an expected pressure of the lookup table 162, in the case of the DI fuel injector 150 only receiving the pilot fuel 112/114, the fuel controller 140 may issue the DI fuel injector control signal 154 to cause the DI fuel injector 150 to stay open longer (increase injection duration). If the DI fuel injector 150 receives both the pilot fuel 112/114 and the primary fuel 104, the fuel controller 140 may issue the DI fuel injector control signal 154 to cause the pilot fuel control 158 to stay open longer (increase injection duration). The fuel controller 140 continues to monitor the detected pressure in the cylinder.

If increasing the amount of the pilot fuel 112/114 into the cylinder up to a predetermined volume of the pilot fuel 112/114 does not clear the out-of-range determination, the fuel controller 140 may also change the amount of the primary fuel 104 entering the cylinder. The fuel controller 140 may change the amount of the primary fuel 104 concurrently with the changing of the amount of the pilot fuel 112/114 or may change the amount of the primary fuel 104 after a predetermined volume of increase of the pilot fuel 112/114. For example, if the fuel controller 140 determines that the detected pressure is 2 psig below the expected pressure indicating an out-of-range condition, the fuel controller 140 may increase the amount of the pilot fuel 112/114 to 1 mg/s while also increasing the amount of the primary fuel 104 to 4 mg/s (the flow rates are merely an example, as the actual flow rates may vary depending on the particular configuration of the engine 102). In another example, if the fuel controller 140 determines that the detected pressure is 2 psig below the expected pressure indicating an out of range condition, the fuel controller 140 may increase the amount of the pilot fuel 112/114 to 1 mg/s and wait a predetermined period of time to determine if the increase in the amount of the pilot fuel 112/114 clears the out-of-range condition. If after a period of time the increase in the pilot fuel 112/114 does not clear the out-of-range pressure-based combustion characteristic, the fuel controller 140 may increase the amount of the primary fuel 104 to 4 mg/s. The fuel controller 140 may continue the remediation process of increasing the pilot fuel 112/114 and/or the primary fuel 104 until the out-of-range pressure-based combustion characteristic is cleared or the amount of change in the volume of the pilot fuel 112/114 and/or the primary fuel 104 is above or below a permitted volume change. In some examples, the fuel controller 140 may also receive inputs regarding combustion products, such as nitrogen oxides, and adjust the amount of the primary fuel 104 to maintain an acceptable level of combustion products. The fuel controller 140 continues to monitor the detected pressure and adjusts the change in the volume of the pilot fuel 112/114 and/or the primary fuel 104 to maintain the detected pressure within a range of the expected pressure.

At step 316, the fuel controller 140 determines if the out-of-range pressure-based combustion characteristic for the one or more cylinders has cleared. If the out-of-range pressure-based combustion characteristic has not cleared, the method 300 continues with the fuel delivery remediation process of step 314. If the out-of-range pressure-based combustion characteristic has cleared, at step 318 the fuel controller 140 ends the fuel delivery remediation process and continues back to step 302.

Figure 4:
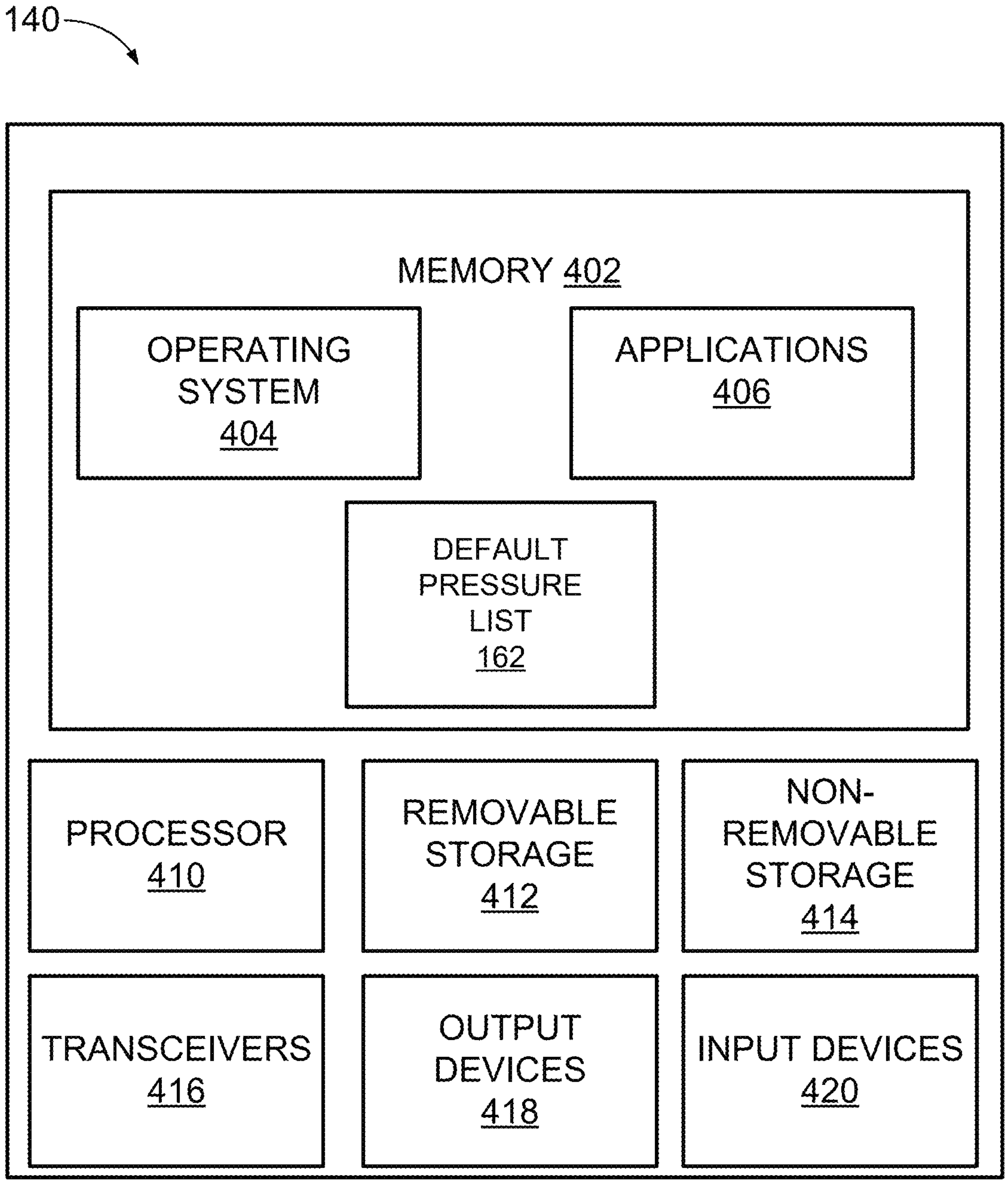
FIG. 4 depicts a component level view of a controller for use with the systems and methods described herein, in accordance with various examples of the presently disclosed subject matter.

FIG. 4 depicts a component level view of the fuel controller 140 for use with the systems and methods described herein, in accordance with various examples of the presently disclosed subject matter. The fuel controller 140 could be any device capable of providing the functionality associated with the systems and methods described herein. The fuel controller 140 can comprise several components to execute the above-mentioned functions. The fuel controller 140 may be comprised of hardware, software, or various combinations thereof. As discussed below, the fuel controller 140 can comprise memory 402 including an operating system (OS) 404 and one or more applications 406. The applications 406 may include applications that provide for the port fuel injector control signal 142, the DI fuel injector control signal 154, and/or the pilot fuel system control signal 170, as well as implement one or more steps of the method 300 described above.

The fuel controller 140 can also comprise one or more processors 410 and one or more of removable storage 412, non-removable storage 414, transceiver(s) 416, output device(s) 418, and input device(s) 420. In various implementations, the memory 402 can be volatile (such as random-access memory (RAM)), non-volatile (such as read only memory (ROM), flash memory, etc.), or some combination of the two. The memory 402 can include data pertaining to the lookup table 162.

The memory 402 can also include the OS 404. The OS 404 varies depending on the manufacturer of the fuel controller 140. The OS 404 contains the modules and software that support basic functions of the fuel controller 140, such as scheduling tasks, executing applications, and controlling peripherals and valves. The OS 404 can also enable the fuel controller 140 to send and retrieve other data and perform other functions.

In some implementations, the processor(s) 410 can be one or more central processing units (CPUs), graphics processing units (GPUs), both CPU and GPU, or any other combinations and numbers of processing units. The fuel controller 140 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the fuel controller 140. Any such non-transitory computer-readable media may be part of the fuel controller 140 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the fuel controller 140 and one or more pumps or valves), the Internet, and/or an intranet. Specifically, the transceiver(s) 416 can include one or more transceivers that can enable the fuel controller 140 to send and receive data. Thus, the transceiver(s) 416 can include multiple singlechannel transceivers or a multi-frequency, multi-channel transceiver to enable the fuel controller 140 to send and receive video calls, audio calls, messaging, etc. The transceiver(s) 416 can enable the fuel controller 140 to connect to multiple networks including, but not limited to 2G, 3G, 4G, 5G, and Wi-Fi networks. The transceiver(s) 416 can also include one or more transceivers to enable the fuel controller 140 to connect to future (e.g., 6G) networks, Internet-of-Things (IoT), machine-to machine (M2M), and other current and future networks. The transceivers 416 may also include wired connections to facilitate wired communications with one or more components.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver (s) 416 can enable the fuel controller 140 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

Figure 5:
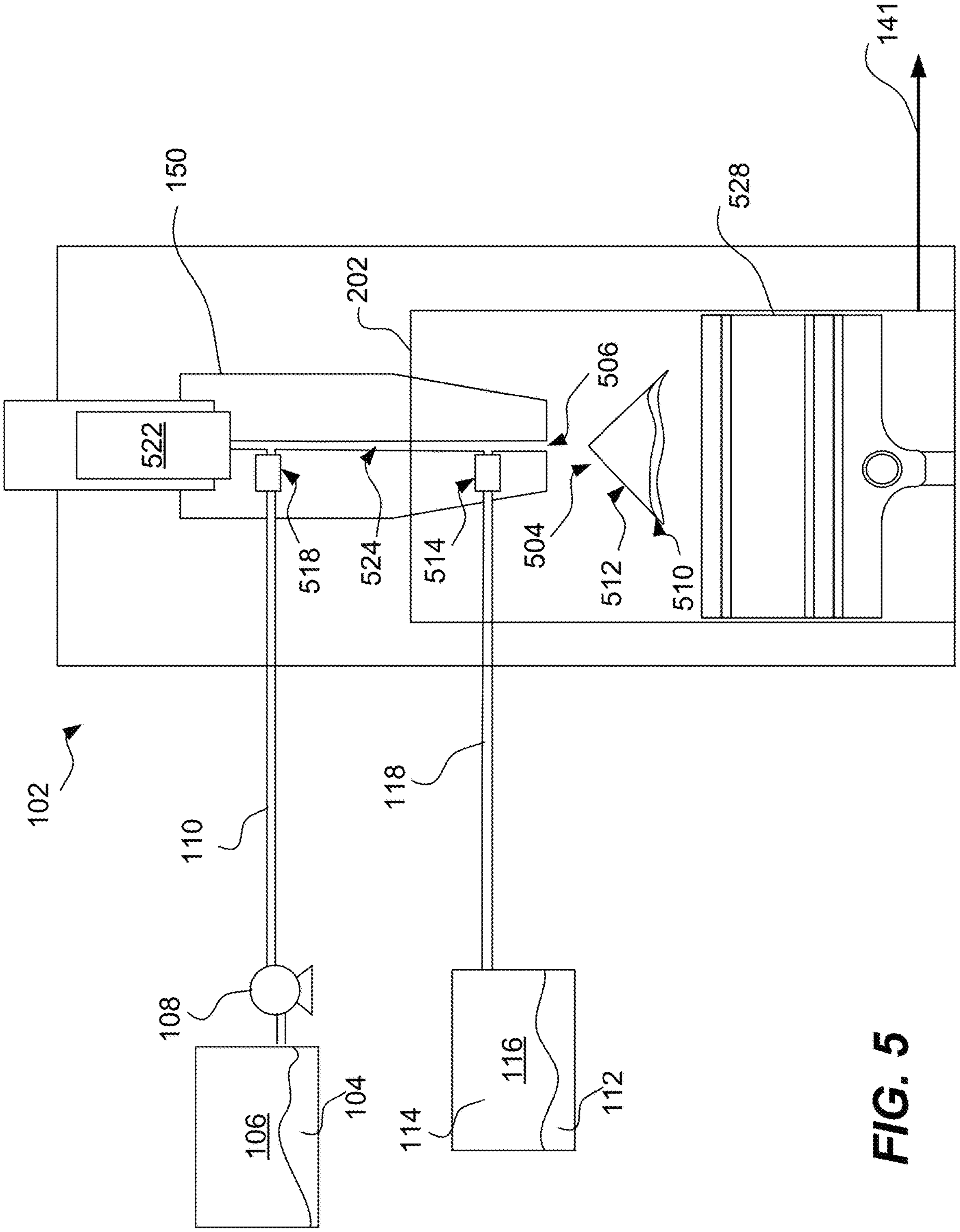
FIG. 5 illustrates a direct injection fuel injector that may be used in a combustion engine system configured to control emissions, in accordance with various embodiments of the presently disclosed subject matter.

FIG. 5 illustrates the DI fuel injector 150 that may be used in a combustion engine system configured to manage combustion characteristics in a cylinder, in accordance with various embodiments of the presently disclosed subject matter. It should be noted that the DI fuel injector 150 as illustrated in FIG. 3 is merely to illustrate example fluid flows using a DI fuel injector, as the DI fuel injector 150 and other components illustrated herein may have additional features, components, or structures that are not illustrated in this and other figures but may otherwise be used. Further, the DI fuel injector 150 is an example of a type of DI fuel injector that may be used, as other configurations and designs may be used and are considered to be within the scope of the present disclosure. For example, the DI fuel injector 150 includes a common injection port into the cylinder 202. In other examples, the DI fuel injector 150 may have separate injection ports for the primary fuel 104 and the pilot fuel 112/114 into the cylinder 202. Returning to FIG. 5, the DI fuel injector 150 injects a fuel mass 504 through an injector nozzle 506 into the cylinder 202 of the engine 102 for combustion. It should be noted that although one DI fuel injector 150 is illustrated, the presently disclosed subject matter may be used with other types of injectors, including injectors with separate ports for the primary fuel and the secondary fuel, and are considered to be within the scope of the presently disclosed subject matter.

The fuel mass 504 includes a pilot fuel portion 510 comprising the pilot fuel 112/114 and a primary fuel portion 512 comprising the primary fuel 104. The pilot fuel 112/114 is injected first to commence the combustion process in the cylinder 202. The DI fuel injector 150 includes a pilot fuel injector 514 configured to periodically open and close to allow the pilot fuel 112/114 from the pilot fuel rail 118 to be introduced into the cylinder 202. The DI fuel injector 150 further includes a primary fuel injector 518 configured to periodically open and close for receiving the primary fuel 104 from the primary fuel rail 110. The opening and closing of the pilot fuel injector 514 and/or the primary fuel injector 518 is controlled by a controller, such as the fuel controller 140 of FIG. 1. To inject the fuel mass 504, the DI fuel injector 150 includes a piston 522. The piston 522 is configured to create a vacuum in a first action to pull the primary fuel 104 and the pilot fuel 112/114 into an injection chamber 524 of the DI fuel injector 150.

The piston 522 then creates a pressure in a second action to push the primary fuel 104 and the pilot fuel 112/114 in the injection chamber 524 into the cylinder 202. It should be noted that in some examples, the piston 522 is not used, as in some configurations, the fluidic pressure within the pilot fuel rail 118 and/or the primary fuel rail 110 is sufficient to force the pilot fuel 112/114 and the primary fuel 104 into the cylinder 202. In the example DI fuel injector 150 illustrated in FIG. 5, the pilot fuel 112/114 is injected first because of the lower position (i.e., fluidically closer to the injector nozzle 506) of the pilot fuel 112/114 in the chamber relative the primary fuel 104. The combustion of the fuel mass 504 pushes down a cylinder piston 528, whereby the combustion products exit the cylinder 202 through the exhaust 141. During use, the amount of the primary fuel 104 and the pilot fuel 112/114 injected into the cylinder 202 can be changed in several ways. For example, the timing of the opening and closing of the pilot fuel injector 514 and/or the primary fuel injector 518 can be changed so that the pilot fuel injector 514 and/or the primary fuel injector 518 is open longer (thus allowing more fuel) or open shorter (thus reducing fuel input).

INDUSTRIAL APPLICABILITY

The present disclosure relates generally to internal combustion engines that use a pilot fuel, such as DME, to assist with the ignition of a primary fuel such as methanol. During operations, for various reasons, the quality of combustion in one or more cylinders of the engine 102 may change. These reasons may include, but are not limited to, component degradation, corrosion, or failure. Various aspects of the present disclosure use in-cylinder pressure sensing units 160A-160C to detect the combustion pressures in one or more of the combustion cylinders 202A-202C of the engine 102. The fuel controller 140 receives pressure readings from the pressure sensing units and determines, using pressures provided in the lookup table 162, if the detected pressure indicates that one or more pressure-based combustion characteristic is out of range. In some examples, the fuel controller 140 can calculate various pressure-based combustion characteristics using the detected pressure. In other examples, the fuel controller 140 may use the values in the lookup table 162 to determine if a pressure-based combustion is out of range. In some examples, the fuel controller 140 can use more than one remediation process to change the operating conditions of the out-of-range cylinder.

One of the remediation processes is the fuel delivery remediation process. In this process, the fuel controller 140 modifies the fuel MAP timing of the injectors for the pilot fuel and/or the primary fuel. The fuel controller 140 continues to change the fuel delivery until the out-of-range pressure condition, such as a low-pressure or high-pressure condition, has cleared. Another remediation process is the pilot fuel system remediation process. The fuel controller 140 may use the pilot fuel system remediation process rather than the fuel delivery remediation process when more than one combustion cylinder is experiencing an out-of-range pressure-based combustion characteristic. Although not dispositive, when more than one combustion cylinder is experiencing an out-of-range pressure-based combustion characteristic, this may indicate that there is a common issue, such as the pilot fuel system 120. When using the pilot fuel system remediation process, the fuel controller 140 may issue one or more pilot fuel system control signals 170 to change the operating conditions of the pilot fuel system 120.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of operating a dual fuel, internal combustion engine, the method comprising:

receiving a first pressure reading indication of a first combustion pressure of a first cylinder of the internal combustion engine;

determining that the first pressure reading of the first cylinder comprises an out-of-range pressure-based combustion characteristic;

commencing a fuel delivery remediation process by changing either a first amount of time a pilot fuel injector for the first cylinder is open or a second amount of time a primary fuel injector for the first cylinder is open;

determining that a second pressure reading indicates that the out-of-range pressure-based combustion characteristic has cleared;

ending the fuel delivery remediation process;

determining a second pressure reading of a second cylinder comprises an out-of-range pressure-based combustion characteristic for the second cylinder while the first pressure reading comprises the out-of-range pressure-based combustion characteristic for the first cylinder; and commencing a pilot fuel system remediation process by modifying an operation of the pilot fuel system, the modification comprising increasing an amount of primary fuel introduced into a reactor used to produce pilot fuel from the primary fuel to increase a production rate of the pilot fuel.

2. The method of claim 1, wherein changing the first amount of time the pilot fuel injector for the first cylinder is open comprises:

determining that the out-of-range pressure-based combustion characteristic comprises an out-of-range pressure condition, an out-of-range mean effective pressure (iMEP) gross, an out-of-range pressure, an out-of-range integrated net heat release rate, an out-of-range ignition delay, or an out-of-range apparent heat release rate (AHRR) in the first cylinder; and increasing the first amount of time the pilot fuel injector is open.

3. The method of claim 2, further comprising:

determining that the out-of-range pressure-based combustion characteristic in the first cylinder has not cleared; and increasing the second amount of time the primary fuel injector is open.

4. The method of claim 1, wherein determining that the first pressure reading of the first cylinder comprises the out-of-range pressure-based combustion characteristic comprises:

receiving the first pressure reading;

accessing a lookup table;

comparing the first pressure reading to an expected pressure for the first cylinder; and determining that the first pressure reading is below the expected pressure.

5. The method of claim 1, wherein determining that the first pressure reading of the first cylinder comprises the out-of-range pressure-based combustion characteristic comprises:

receiving the first pressure reading and a plurality of second pressure readings for the first cylinder;

accessing a lookup table;

comparing the first pressure reading and the plurality of second pressure readings to an expected pressure for the first cylinder; and determining that the first pressure reading and the plurality of second pressure readings fluctuate between a predetermined range of pressures within a predetermined period of time.

6. The method of claim 1, wherein modifying the operation of the pilot fuel system comprises increasing an outlet temperature of a heater to increase a reaction rate of a reactor used to produce pilot fuel from primary fuel.

7. The method of claim 1, wherein modifying the operation of the pilot fuel system comprises reducing a temperature of a condenser to increase an amount of primary fuel condensing out of reactor product of a reactor used to produce pilot fuel from the primary fuel.

8. A fuel controller configured to actively manage combustion pressures of a dual fuel, internal combustion engine, the controller comprising:

a memory storing computer-executable instructions; and a processor in communication with the memory, the computer-executable instructions causing the processor to perform acts comprising:

receiving a first pressure reading indicating a first combustion pressure of a first cylinder of the internal combustion engine;

determining that the first pressure reading of the first cylinder comprises an out-of-range pressure-based combustion characteristic;

commencing a fuel delivery remediation process by changing either a first amount of time a pilot fuel injector for the first cylinder is open or a second amount of time a primary fuel injector for the first cylinder is open;

determining that the first pressure reading indicates that the out-of-range pressure-based combustion characteristic has cleared;

ending the fuel delivery remediation process;

determining a second pressure reading of a second cylinder comprises an out-of-range pressure-based combustion characteristic for the second cylinder while the first pressure reading comprises an out-of-range pressure-based combustion characteristic for the first cylinder; and commencing a pilot fuel system remediation process by modifying an operation of the pilot fuel system, the modification comprising:

increasing an outlet temperature of a heater to increase a reaction rate of a reactor used to produce pilot fuel from primary fuel or increasing an amount of primary fuel introduced into a reactor used to produce pilot fuel from the primary fuel to increase a production rate of the pilot fuel; and reducing a temperature of a condenser to increase an amount of primary fuel condensing out of reactor product of a reactor used to produce pilot fuel from the primary fuel.

9. The fuel controller of claim 8, wherein the computer-executable instructions for determining that the first pressure reading of the first cylinder comprises an out-of-range pressure-based combustion characteristic comprises computer-executable instructions to cause the processor to perform acts comprising:

accessing a lookup table;

comparing the first pressure reading to an expected pressure for the first cylinder; and determining that the first pressure reading is below the expected pressure.

10. The fuel controller of claim 8, wherein the computer-executable instructions for determining that the first pressure reading of the first cylinder comprises an out-of-range pressure-based combustion characteristic comprises computer-executable instructions to cause the processor to perform acts comprising:

receiving the first pressure reading and a plurality of second pressure readings for the first cylinder;

accessing a lookup table;

comparing the first pressure reading and the plurality of second pressure readings to an expected pressure for the first cylinder; and determining that the first pressure reading and the plurality of second pressure readings fluctuate between a predetermined range of pressures within a predetermined period of time.

11. The fuel controller of claim 8, wherein the computer-executable instructions for changing the first amount of time the pilot fuel injector for the first cylinder is open comprises computer-executable instructions to cause the processor to perform acts comprising:

determining that the out-of-range pressure-based combustion characteristic comprises an out-of-range pressure condition, an out-of-range mean effective pressure (iMEP) gross, an out-of-range integrated net heat release rate, an out-of-range ignition delay, or an out-of-range apparent heat release rate (AHRR) in the first cylinder;

increasing the first amount of time the pilot fuel injector is open;

determining that the out-of-range pressure-based combustion characteristic in the first cylinder has not cleared; and increasing the second amount of time the primary fuel injector is open.

12. The fuel controller of claim 8, wherein a primary fuel comprises methanol and a pilot fuel comprises dimethyl ether.

13. A combustion engine system, comprising:

an internal combustion engine having a first cylinder and a second cylinder for combustion, the internal combustion engine configured to receive a primary fuel and a secondary fuel, wherein the secondary fuel is a pilot fuel for the primary fuel;

a first direct-injection ("DI") fuel injector configured to receive the primary fuel and the pilot fuel for injection into the first cylinder for combustion, wherein combustion in the first cylinder generates a first combustion pressure;

a second DI fuel injector configured to receive the primary fuel and the pilot fuel for injection into the second cylinder for combustion, wherein combustion in the second cylinder generates a second combustion pressure; and a fuel controller configured to actively manage the first combustion pressure and the second combustion pressure, the fuel controller comprising:

a memory storing computer-executable instructions; and a processor in communication with the memory, the computer-executable instructions causing the processor to perform acts comprising:

receiving a first pressure reading indication the first combustion pressure;

determining that the first pressure reading comprises an out-of-range pressure-based combustion characteristic;

commencing a fuel delivery remediation process for the first cylinder by changing either a first amount of time a pilot fuel injector of the first DI fuel injector is open or a second amount of time a primary fuel injector of the first DI fuel injector is open;

determining that the first pressure reading indicates that the out-of-range pressure-based combustion characteristic has cleared;

ending the fuel delivery remediation process;

receiving a second pressure reading of the second cylinder;

determining that the second cylinder and the first cylinder are in the out-of-range pressure-based combustion characteristic; and commencing a pilot fuel system remediation process by modifying an operation of a pilot fuel system, the modification comprising:

increasing an outlet temperature of a heater to increase a reaction rate of a reactor used to produce pilot fuel from primary fuel or increasing an amount of primary fuel introduced into a reactor used to produce pilot fuel from the primary fuel to increase a production rate of the pilot fuel; and reducing a temperature of a condenser to increase an amount of primary fuel condensing out of reactor product of a reactor used to produce pilot fuel from the primary fuel.

14. The combustion engine system of claim 13, wherein the computer-executable instructions for determining that the first pressure reading of the first cylinder comprises an out-of-range pressure-based combustion characteristic comprises computer-executable instructions to cause the processor to perform acts comprising:

accessing a lookup table;

comparing the first pressure reading to an expected pressure for the first cylinder; and determining that the first pressure reading is below the expected pressure.

* * * * *